(12) United States Patent
Ramamurthi et al.

(10) Patent No.: US 11,477,808 B2
(45) Date of Patent: Oct. 18, 2022

(54) SYSTEM AND METHOD FOR LOW LATENCY INTEGRATED ACCESS AND BACKHAUL

(71) Applicant: Verizon Patent and Licensing Inc., Basking Ridge, NJ (US)

(72) Inventors: Vishwanath Ramamurthi, San Ramon, CA (US); Arda Aksu, Lafayette, CA (US); Donna L. Polehn, Mercer Island, WA (US); Jin Yang, Orinda, CA (US); David Chiang, Fremont, CA (US); Lalit R. Kotecha, San Ramon, CA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 30 days.

(21) Appl. No.: 17/009,097

(22) Filed: Sep. 1, 2020

(65) Prior Publication Data

US 2022/0070889 A1 Mar. 3, 2022

(51) Int. Cl.
*H04W 72/12* (2009.01)
*H04W 72/04* (2009.01)
*H04W 72/14* (2009.01)
*H04W 88/14* (2009.01)

(52) U.S. Cl.
CPC ... *H04W 72/1263* (2013.01); *H04W 72/0453* (2013.01); *H04W 72/14* (2013.01); *H04W 88/14* (2013.01)

(58) Field of Classification Search
None
See application file for complete search history.

(56) References Cited

U.S. PATENT DOCUMENTS

| | | | |
|---|---|---|---|
| 2010/0202322 A1* | 8/2010 | Cai | H04W 76/38 370/254 |
| 2020/0245379 A1* | 7/2020 | Hong | H04W 4/16 |
| 2020/0351930 A1* | 11/2020 | Luo | H04W 72/1273 |
| 2021/0051695 A1* | 2/2021 | Majmundar | H04W 72/14 |
| 2021/0127293 A1* | 4/2021 | Hong | H04B 7/15528 |

* cited by examiner

*Primary Examiner* — Kodzovi Acolatse

(57) ABSTRACT

A network device may be configured to: send a preemptive scheduling request to an Integrated Access and Backhaul (IAB) node over a wireless link between the network device and the IAB node; receive a scheduling grant from the IAB node over the wireless link; and send data to the IAB node over the wireless link at times indicated by the scheduling grant from the IAB node.

20 Claims, 10 Drawing Sheets

☐ UPLINK SHARED
  CHANNEL

▨ REFERENCE SIGNALS
  AND CONTROL
  CHANNELS

SYSTEM AND METHOD FOR LOW LATENCY INTEGRATED ACCESS AND BACKHAUL

BACKGROUND INFORMATION

A radio access network (RAN) is one portion of a telecommunication system. A RAN allows wireless communication devices, such as mobile phones, to connect to the system over radio frequency (RF) links. The system can render different types of telecommunication services to the mobile devices over RANs.

Recently, many technological improvements have been introduced to RANs. For example, some RANs now include self-organizing network (SON) components. These SON components are coupled to other network components in RANs, such as base station antennas, for example, to modify their beam widths, or to apply various other optimization techniques. In another example, RANs include Integrated Access and Backhaul (IAB) nodes. An IAB node has the functionality of a base station, but, in contrast to typical base stations, connects to other elements of the RAN over wireless links rather than cables, wires, or optical fibers.

DETAILED DESCRIPTION OF PREFERRED EMBODIMENTS

The following detailed description refers to the accompanying drawings. The same reference numbers in different drawings may identify the same or similar elements.

The systems and methods described herein relate to reducing latency for mobile devices (e.g., smart phones, etc.) attached to a service provider network through Integrated Access and Backhaul (IAB) nodes. A typical base station provides a point-of-attachment for mobile terminals that are to receive communication services from a provider network. During its operation, the base station establishes wireless links (e.g., Radio Frequency (RF) link) with the mobile terminals. The base station is connected to the provider network by backhaul cables, and therefore, any signals and data sent from/to the mobile terminals to/from the provider network pass through the backhaul cables.

Like the base station, an IAB node provides a point-of-attachment to mobile terminals. However, in contrast to the base station, the IAB node has a wireless backhaul link to the provider network. That is, for the IAB node, both its access function (for the mobile terminal) and the backhaul function are integrated into its wireless communication capabilities. An IAB node may operate in any New Radio (NR) frequency band, while its access link may be either in-band (i.e., in the same frequency band as its backhaul link) or out-of-band (i.e., in a different frequency band as the backhaul ink).

Figure 1A:
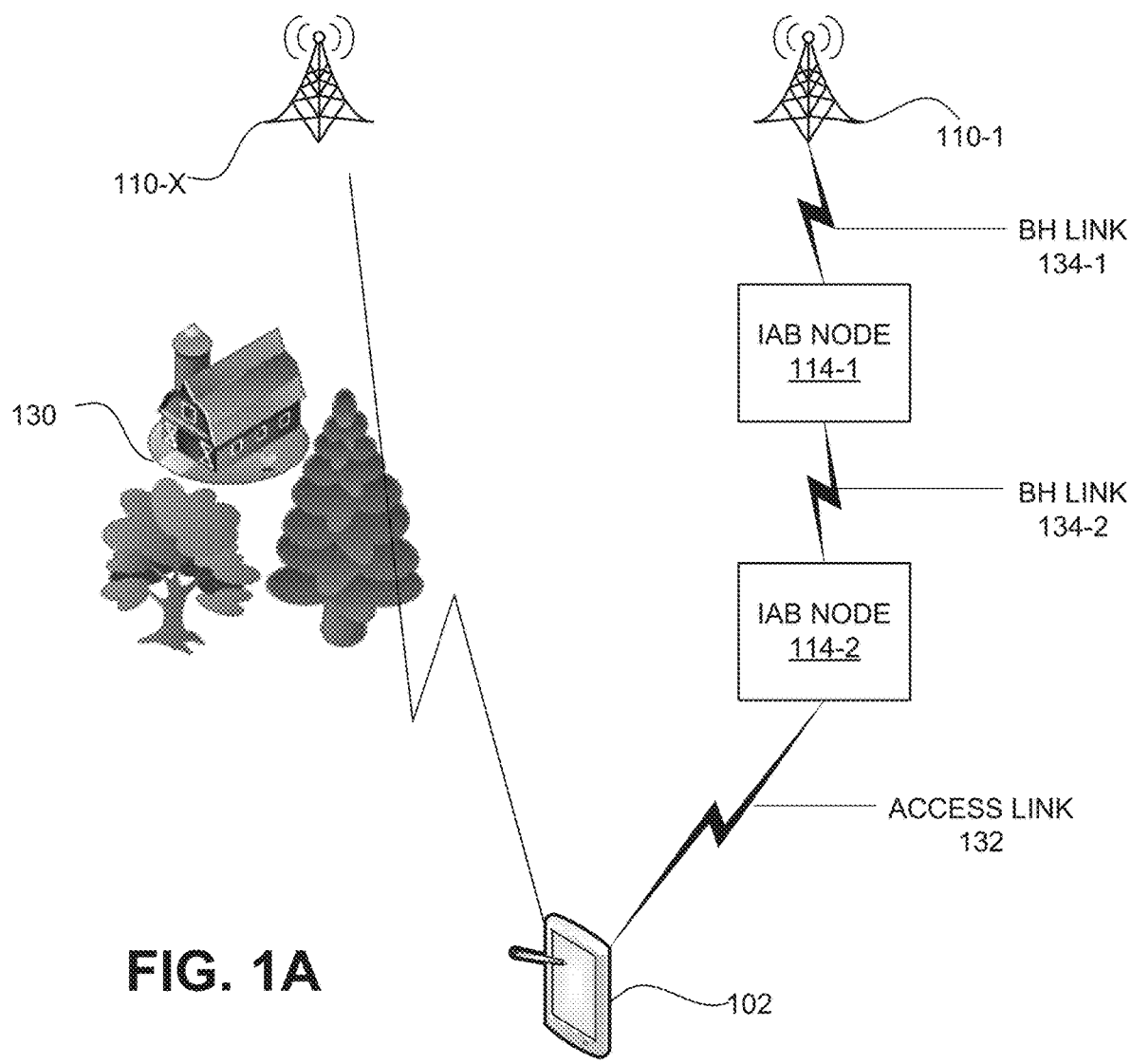
FIG. 1A illustrates the concepts associated with reducing latency in Integrated Access band Backhaul (IAB) nodes.

FIG. 1A illustrates the concepts associated with reducing latency in IAB nodes. Assume that a service provider wishes to allow mobile terminals (MTs), such as a mobile terminal (MT) 102, to establish a wireless link with base station 110-X to receive communication services. However, due to physical barriers and obstacles 130, signals from base station 110-X is too weak to reach MT 102. To provide a better point-of-attachment for devices such as MT 102, without having to physically lay cables, the service provider can deploy IAB nodes 114-1 and 114-2. After the deployment, MT 102 may establish an access link 132 to IAB node 114-2. IAB node 114-1 has a wireless backhaul link 134-1 to base station 110-1, and IAB node 114-2 has a wireless backhaul link 134-2 to IAB node 114-1. Access link 132, backhaul link 134-2, and backhaul link 134-1 form a communication path between MT 102 and base station 110-1.

In FIG. 1A, although IAB nodes 114 provide points-of-attachment to MT 102, uplink/downlink signal/data from/to MT 102 must pass through multiple hops (i.e., IAB nodes 114-1 and 114-2). If each IAB node 114 injects a delay in the communication path, MT 102 can experience noticeable latency. In use case scenarios where the communication path between MT 102 and base station 110-1 has a larger number of IAB nodes 114, the latency can be significant. The systems and methods described herein reduce such IAB node-related latencies.

Figure 1B:
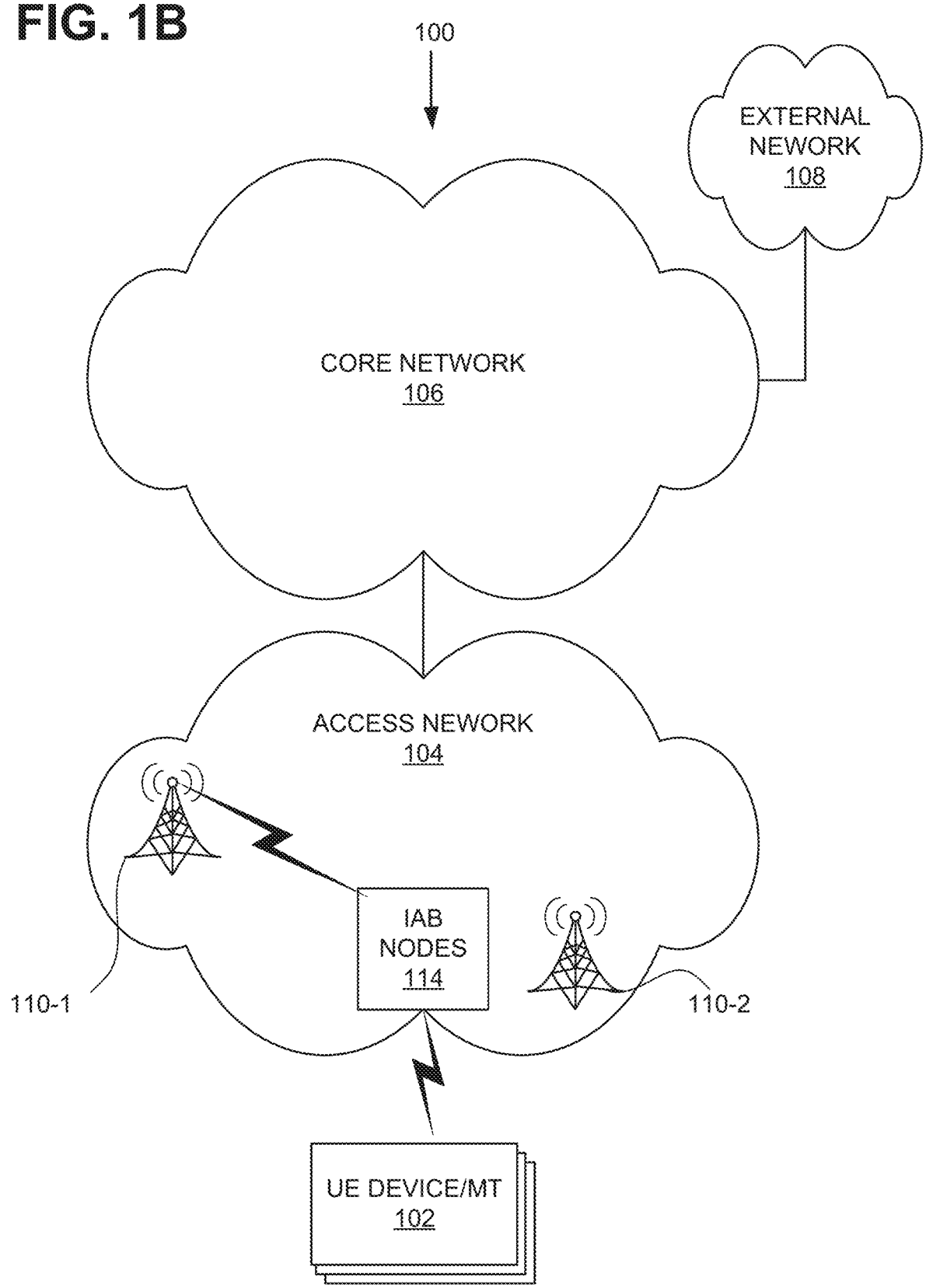
FIG. 1B illustrates exemplary network environment in which the systems and methods described herein may be implemented.

FIG. 1B illustrates an exemplary network environment 100 in which the systems and methods described herein may be implemented. As shown, environment 100 may include UE devices 102 (referred to as UE devices 102, UE device 102, MT 102, or MTs 102), an access network 104, a core network 106, and an external network 108.

UE device 102 may include a wireless communication device and/or an MT. Examples of UE device 102 include: a smart phone; a tablet device; a wearable computer device (e.g., a smart watch); a laptop computer; a portable gaming system; and an Internet-of-Thing (IoT) device. In some implementations, UE device 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE device 102 may send packets over or to access network 104.

In one implementation, UE device 102 may include a program that evaluates UE device bandwidth requirements, the amount of buffer space allocated for its application, and signal strengths to IAB nodes 114. Based on the information, UE device 102 may issue a preemptive scheduling request for uplink transmission to IAB nodes 114. If granted, each of the IAB nodes 114 in the communication path from UE device 102 to base station 110-1 may exhibit less delay, and thus, IAB nodes 114 would have less latency associated with the UE uplink transmission. Additionally or alternatively, the program may receive a downlink preemptive scheduling request that originates from a base station 110-1. In granting the request, the program may prepare for more efficient receipt of downlink data at the scheduled times.

Access network 104 may allow UE device 102 to access core network 106. To do so, access network 104 may establish and maintain, with participation from UE device 102, an over-the-air channel with UE device 102; and maintain backhaul channels with core network 106. Access network 104 may convey information through these channels, from UE device 102 to core network 106 and vice versa.

Access network 104 may include an LTE radio network, a Fifth Generation (5G) radio network and/or another advanced radio network. These radio networks may include many wireless stations and JAB nodes. In FIG. 1B, these are depicted as wireless stations 110-1 and 110-2 (generically referred to as wireless station 110 and collectively as wireless stations 110) and IAB nodes 114 for establishing and maintaining an over-the-air channel with UE device 102.

Wireless station 110 may include a Fourth Generation (4G), 5G, or another type of wireless station (e.g., evolved Node B (eNB), next generation Node B (gNB), etc.) that includes one or more RF transceivers. In FIG. 1B, wireless station 110-1 is depicted as receiving a backhaul wireless link from IAB nodes 114. A wireless station 110 that is attached to an IAB node via a wireless backhaul link is herein referred to as IAB donor 110-1.

According to one implementation, JAB donor 110-1 may include an intelligent controller. In some implementations, the intelligent controller may implement several features to reduce IAB node latency. For example, the intelligent controller may act as a router with respect to IAB nodes 114. In particular, IAB donor 110-1 may generate a routing information base (RIB) and a forwarding information base (FIB) that map different paths to IAB nodes 114. IAB donor 110-1 may forward its routing information to IAB nodes 114. In possession of IAB routing information, IAB donor may a select a particular IAB path, among different possible paths, to UE device 102 (e.g., select the path with the least latency).

In another example, the intelligent controller may issue a preemptive downlink scheduling request to IAB nodes 114. In addition, depending on the implementation, the intelligent controller may provide additional information to other components in IAB donor 110-1, for IAB donor 110-1 to determine whether to provide an affirmative response to an uplink preemptive scheduling request from UE device 102.

IAB nodes 114 may include one or more devices to relay signals from IAB donor 110-1 to UE device 102 and from UE device 102 to IAB donor 110-1. IAB nodes 114 may have an access link with UE device 102, and have a wireless backhaul link to IAB donor 110-1. Like AIB donor 110-1, an IAB node 114 may have the capability to operate as a router, for exchanging routing information with IAB donor 110-1 and other IAB nodes 114 and for selecting traffic paths.

According to one implementation, each IAB node 114 includes mechanisms for processing uplink and downlink preemptive scheduling requests from IAB donor 110-1, another IAB node 114, or UE device 102 to reduce latency in the communication path between UE device 102 and IAB donor 110-1. In addition, IAB nodes 114 may enforce admissions control for UE devices 102, apply throttling control for UE devices 102, and provide Quality-of-Service (QoS) bumps to backhaul traffic, to preserve minimum backhaul bandwidths. In some implementations, IAB nodes 114 may drop packets from a UE device application whose hop count or latency requirements cannot be met due to delays at each IAB nodes 114.

Core network 106 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 106 may allow the delivery of Internet Protocol (IP) services to UE device 102, and may interface with other networks, such as external network 108.

Depending on the implementation, core network 106 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Function (AMF), a Session Management Function (SMF), a Unified Data Management (UDM) function, a Network Slice Selection Function (NSSF), a Policy Control Function (PCF), etc.), or another type of core network component.

External network 108 may include networks that are external to core network 106. In some implementations, external network 108 may include packet data networks, such as an Internet Protocol (IP) network. An IP network may include, for example, an IP Multimedia Subsystem (IMS) network that may provide a Short Messaging Service (SMS), Voice-over-IP (VoIP) service, etc.

For simplicity, FIG. 1B does not show all components that may be included in network environment 100 (e.g., routers, bridges, wireless access point, additional networks, additional UE devices 102, etc.). For example. FIG. 1B does not show devices or components which collect traffic-related data from Multi-Access Edge Computing (MEC) clusters that are coupled to wireless stations 110 and content delivery network (CDN) nodes. That is, depending on the implementation, network environment 100 may include additional, fewer, different, or a different arrangement of components than those illustrated in FIG. 1B.

Figure 2:
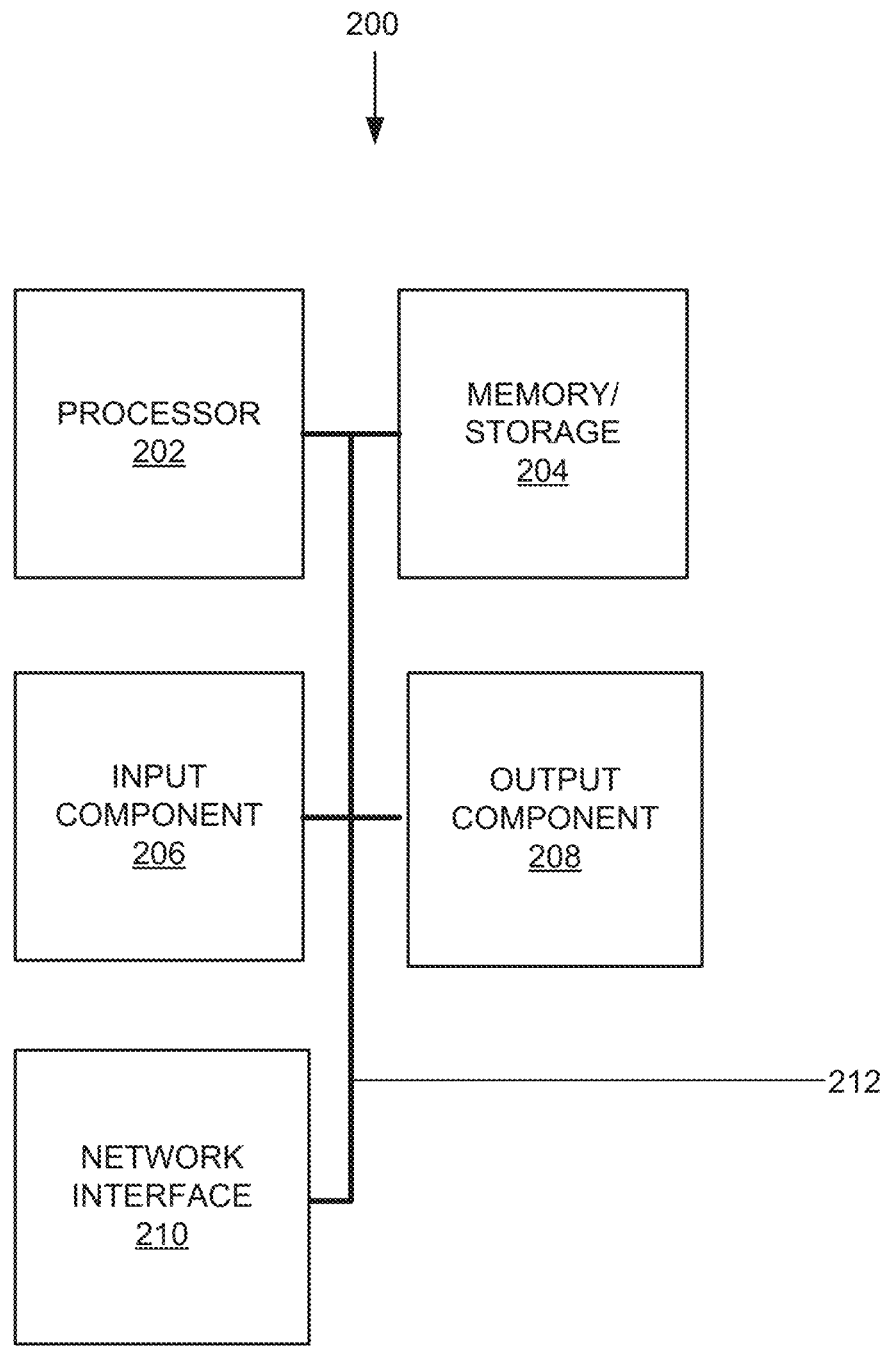
FIG. 2 depicts exemplary components of an exemplary network device of the environment of FIG. 1B.

FIG. 2 depicts exemplary components of an exemplary network device 200. Network device 200 corresponds to or is included in UE device 102, IAB nodes 114, and any of the network components of FIGS. 1A and 1B (e.g., a router, a network switch, servers, gateways, wireless stations 110, etc.). As shown, network device 200 includes a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input and output components 206 and 208 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate with wireless station 110.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of network device 200 to communicate with one another.

Network device 200 may perform the operations described herein in response to processor 202 executing software instructions stored in a non-transient computer-readable medium, such as memory/storage 204. The software instructions may be read into memory/storage 204 from another computer-readable medium or from another device via network interface 210. The software instructions stored in memory or storage (e.g., memory/storage 204, when executed by processor 202, may cause processor 202 to perform processes that are described herein. For example, UE device 102, IAB donor 110-1, and IAB nodes 114 may each include various programs for performing some of the above-described functions for reducing latency.

Figure 3:
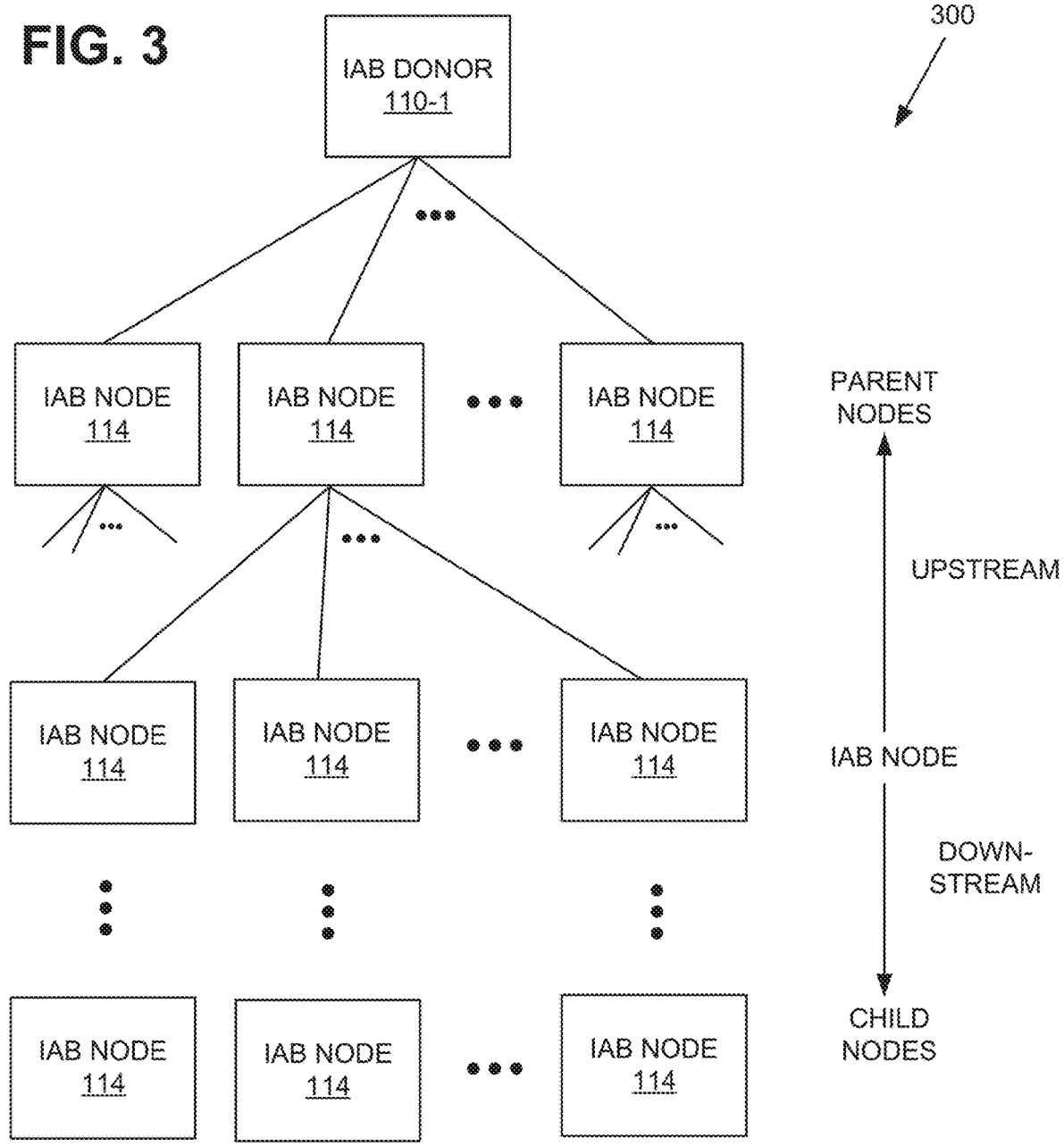
FIG. 3 illustrates an exemplary network layout of IAB nodes according to one implementation.

FIG. 3 illustrates an exemplary network layout 300 of IAB nodes 114 according to one implementation. As shown, some IAB nodes 114 may be attached to IAB donor 110-1 and to other JAB nodes 114 through backhaul links. Each IAB node 114 may have a parent node upstream (e.g., either a parent IAB node 114 or IAB donor 110-1) and a child node downstream (e.g., either a UE device 102 or a child IAB node 114). An IAB node 114 that has no child IAB node 114 is herein referred to as a leaf IAB node 114.

The number of hops from one IAB node 114 to reach IAB donor 110-1 through one communication path may be same or different from the number of hops from another IAB node to reach IAB donor 114 through another communication path. Furthermore, for each IAB node 114, there may be one or more paths to IAB donor 110-1. UE device 102 may establish an access link with any of IAB nodes 114 and not just the leaf IAB nodes 114.

Figure 4:
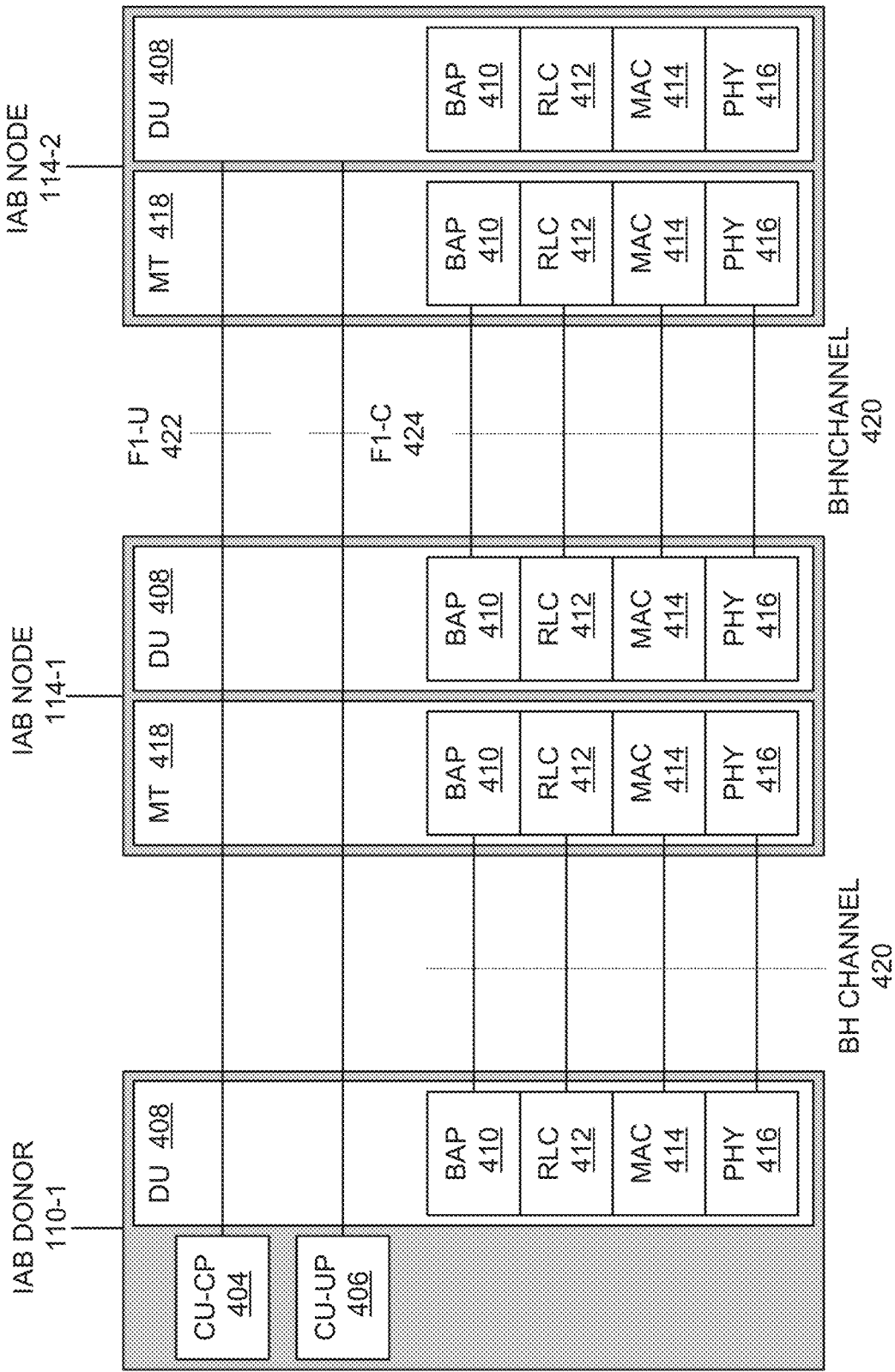
FIG. 4 illustrates exemplary functional components of IAB nodes and an IAB donor in FIGS. 1A-3.

FIG. 4 illustrates exemplary functional components of IAB donor 110-1 and IAB nodes 114 in FIGS. 1A-3. Although only a single IAB node 114-1 is shown to be between IAB node 114-2 and IAB donor 110-1, in other embodiments, there may be many IAB nodes 114 between an IAB node 114 and IAB donor 110-1. Furthermore, although. FIG. 4 shows only a single path from the IAB node 114-2 to IAB donor 110-1, there may be one or more paths from each IAB node 114 to IAB donor 110-1.

As shown, IAB donor 110-1 may include a Central Unit-Control Plane (CU-CP) 404. CU-User Plane (CU-UP) 406, and a Distributed Unit (DU) 408. Each of IAB nodes 114-1 and 114-2 may include DU 408 and a mobile terminal (MT) 418, which has some of the capabilities of UE device/ MT 102. Communication protocol stacks for DUs 408 and MTs 418 are shown for IAB donor 110-1, IAB node 114-1, and IAB node 114-2. Although IAB donor 110-1, IAB node 114-1, and IAB node 114-2 may include additional components, for simplicity, they are not illustrated in FIG. 4.

CU-CP 404 may perform control plane signaling associated with managing DUs 408 (e.g., DU 408 in IAB donor 110-1 or in IAB nodes 114) over F1-C interface. CU-CP 406 may signal to DU 408 over a control plane communication protocol stack that includes, for example, F1 Application Protocol (F1AP) (e.g., the signaling protocol for F1 interface between a CU and a DU), a Stream Control Transmission Protocol (SCTP), and an IP. The DU 408 in IAB nodes 114-1 and 114-2 have corresponding stacks to handle/respond to the signaling (not shown).

CU-UP 406 may perform user plane functions associated with managing DUs 408 over F1-U interface. CU-UP 406 may interact with DU 408 over a user plane communication protocol stack that includes, for example, General Packet Radio Service Tunneling Protocol (GTP)-User plane, the User Datagram Protocol (UDP), and the IP. The DU 408 in IAB nodes 114-1 and 114-2 would have corresponding stacks to handle/respond to messages from CU-UP 406 (not shown).

Although CU-CP 404 and CU-UP 406 (collectively referred to as CU) and DU 408 are part of wireless stations 110, the CU does not need to be physically located near DUs 408, and may be implemented as cloud computing elements, through network function virtualization (NFV) capabilities of the cloud. The CU may communicate with the components of core network 106 through S1/NG interfaces and with other CUs through X2/Xn interfaces.

DUs 408 may provide support for one or more cells covered by radio beams. DUs 408 may handle UE device mobility, from DU to DU, gNB to gNB, cell to cell, beam to beam, etc. As noted above, DUs 408 communicate with a CU through an F1 interface (e.g., F1-U 422 and F1-C 424). In FIG. 4, CU-CP 404 and CU-UP 406 are shown as terminating at the DU 408 in IAB node 114-2. However, for the path between IAB donor 110-1 and IAB node 114-1, CU-CP 404 and CU-UP 406 would terminate at the DU 408 in IAB node 114-1, although this is not shown in FIG. 4.

MT 418 permits its host device to act like a mobile device (e.g., UE device 102). Thus for example, to DU 408 in IAB donor 110-1. MT 418 in IAB node 114-1 behave similarly as a mobile terminal attached to DU 408. The relationship between MT 418 and DU 408 in the context of IAB nodes 114 is established over a Backhaul (BH) channel 420 between DU 408 of IAB donor 110-2 and MT 418 of IAB node 114-1 and BH channel 421 between DU 408 of IAB node 114-1 and MT 418 of IAB node 114-2.

Each of BH channels 420 and 421 between DU 408-MT 418 in FIG. 4 includes multiple network layers that include, for example, a Backhaul Adaptation Layer (BAP) 410, a Radio Link Control (RLC) 412, Media Access Control (MAC) 414, and a Physical layer (PHY) 418. BAP 410 packages data and sends them from a leaf IAB node 114 (e.g., IAB node 114-2) to IAB donor 110-1. RLC 412 receives upper layer packet data units (PDUs), groups them for different transport channels, and transfers them to peer RLC 412 over lower layers. MAC 414 maps the RLC 412 to physical layer data/signals.

MAC 414 multiplexes and de-multiplexes logical channels, prioritizes the channels, handles hybrid automatic repeat request, and deals with random access control. In addition, MAC 414 manages the data as MAC PDUs, and schedules them for transmission over PHY 416. The result of scheduling has the effect of pre-committing, at PHY 416, blocks of frequency ranges and time intervals to be used for transmission of particular signals/data. These blocks of frequency-ranges and time intervals are herein referred to as physical resource bocks (PRBs). That is, scheduling reserves specific PRBs for particular transmissions at specified times. PRBs are components of what is referred to as radio frames, as described below with reference to FIGS. 5A-6B.

Figure 5A:
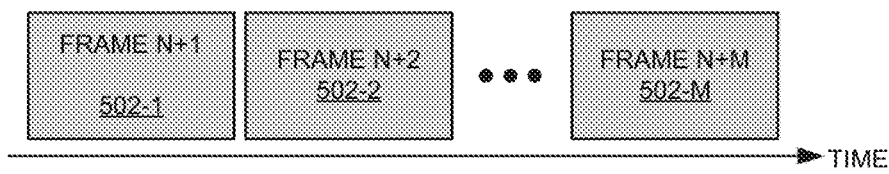
FIG. 5A illustrates exemplary radio frames at the physical layer of the protocol stack of FIG. 4.

FIG. 5A illustrates exemplary radio frames 502-1 through 502-M that are transmitted from/to PHY 416 in DU 408 to/from PHY 416 in MT 418 over the physical channel (e.g., between IAB node 114-2 and IAB node 114-1, between IAB node 114-1 and IAB donor 110-1, or between UE device 102 and an IAB node 114). When data or a signal from DU 408 is sent over a physical channel, they are arranged in blocks, otherwise known as radio frames 502. Each of frames 502 occupies a particular frequency band and spans a particular time interval, which may depend on the particular Radio Access Technology (RAT) used.

Figure 5B:
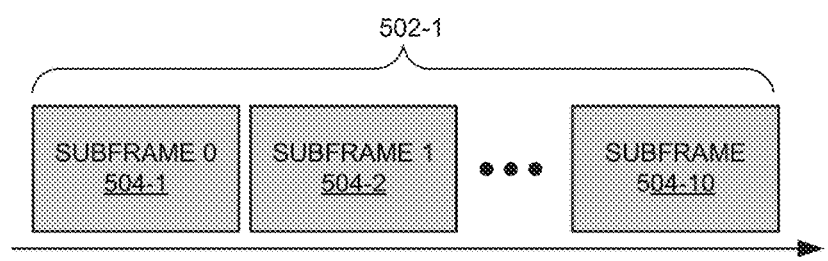
FIG. 5B illustrates exemplary sub-frames of a radio frame of FIG. 5A.
Figure 5C:
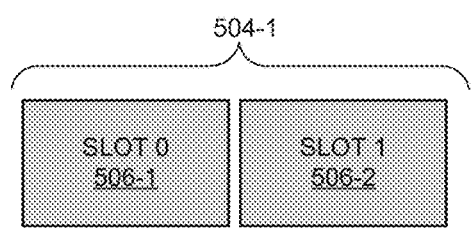
FIG. 5C illustrates exemplary components of a sub-frame of FIG. 5B.

FIG. 5B illustrates exemplary sub-frames of a radio frame 502-1 of FIG. 5A. As shown, each frame 502-1 is partitioned into ten sub-frames 504-1 to 504-10. FIG. 5C illustrates exemplary components of a sub-frame 504-1 of FIG. 5B. As shown, a sub-frame 504-1 includes two slots 506-1 and 506-2.

Figure 5D:
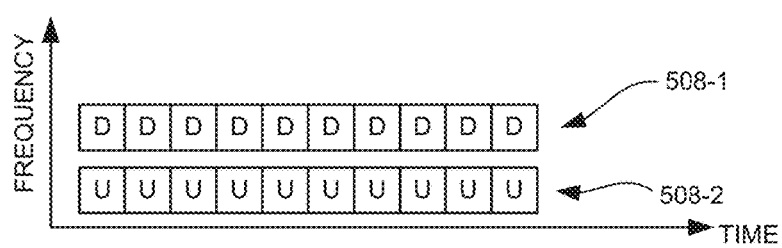
FIG. 5D illustrates exemplary sub-frames of FIG. 5C in a Frequency Division Duplex (FDD) uplink and downlink channels.
Figure 5E:
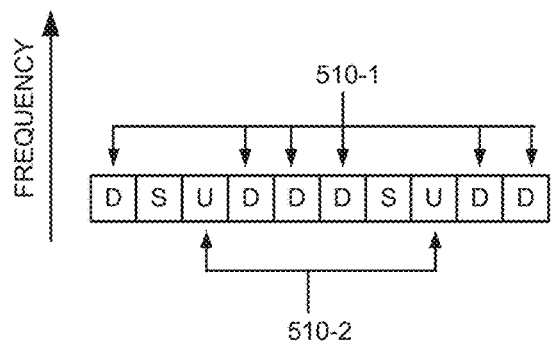
FIG. 5E illustrates exemplary sub-frames of FIG. 5D in a Time Division Duplex (TDD) uplink and downlink channels.

In FIG. 5A, in an uplink, frames 502 may be transmitted from MT 418 to DU 408, and in a downlink, the frames 502 may be transmitted from DU 408 to MT 418. Depending on the implementation, frames 502 in an uplink and a downlink may occupy different frequency bands or the same frequency band. For example, in the frequency division duplex (FDD) mode, the uplink frames and downlink frames may occupy different frequency bands. FIG. 5D illustrates exemplary sub-frames of an FDD uplink and downlink channels. As illustrated, uplink sub-frames 508-2 (marked with letter "U") and downlink sub-frames 508-1 (marked with letter "D") occupy different frequency bands. In another example, FIG. 5E illustrates sub-frames of Time Division Duplex (TDD) uplink and downlink channels. Uplink sub-frames 510-2 (marked with "U") and downlink sub-frames 510-1 (marked with "D") occupy the same frequency band. The sub-frames marked with the letter "S" are known as special frames, and are inserted at the transition between a downlink and an uplink sub-frames.

Figure 6A:
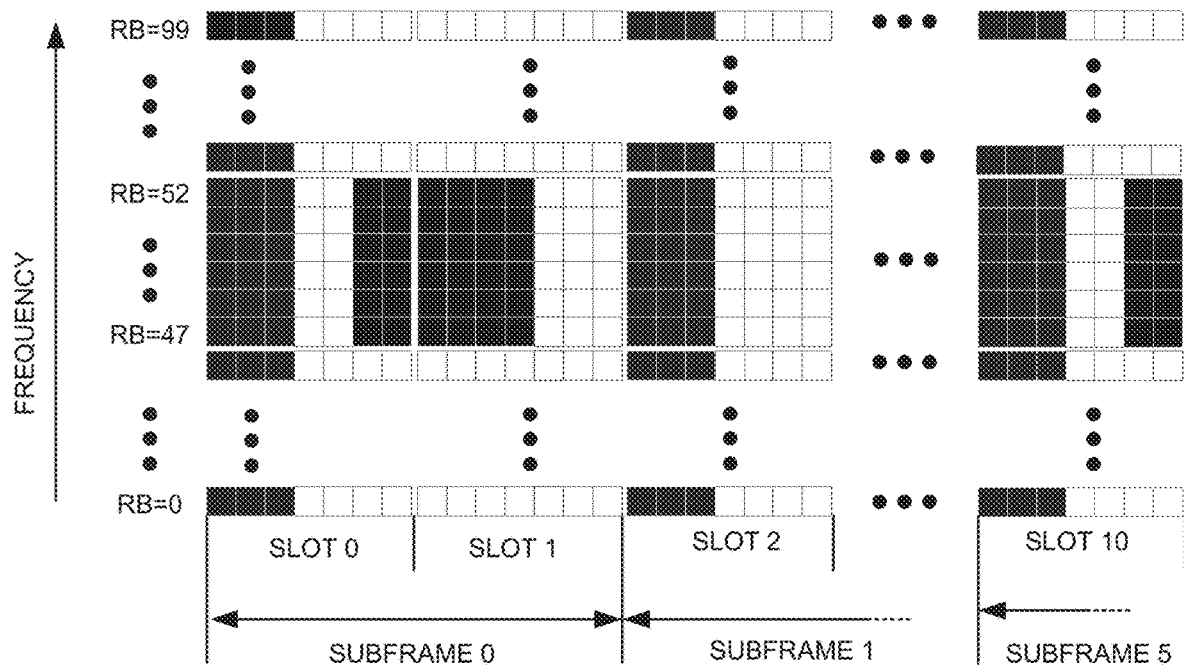
FIGS. 6A and 6B illustrate physical resource blocks, in the radio frames of FIG. 5A-5C, which may be scheduled for uplink and downlink transmissions.

FIG. 6A illustrates an exemplary structure of a radio frame 502 of FDD downlink in greater detail. In FIG. 6A, each square represents a physical resource block (PRB), which is the smallest unit of frequency and time interval that DU 408 or MT 418 may allocate (e.g., schedule) for transmission.

Each PRB may span a number of subcarriers (e.g., 12) in frequency and a number of Orthogonal Frequency Division Multiplex (OFDM) symbol durations in time. The spacing of the subcarriers and the symbol duration may depend on the specific RAT and its mode. For example, for 5G NR, the subcarrier spacing may be 15, 30, 120, or 240 kHz. and the symbol duration may be 66.67, 33.33, 8.33, 4.17 microseconds (excluding cyclic prefixes).

In FIG. 6A, PRBs extend from RB=0 to RB=99 in frequency (e.g., 20 MHz, 100 MHz, 200 MHz, etc., depending on subcarrier spacing) and slightly over half a frame (i.e., slightly over 10 sub-frames) in time. In the example shown, each PRB is one OFDM symbol long (although in other embodiments, a PRB may include additional symbols), each sub-frame includes 14 symbols, and each slot includes 7 OFDM symbols, assuming the standard cyclic prefix (CP). The black squares in FIG. 6A are PRBs that carry specific signals from DU 408 to MT 418.

Figure 6B:
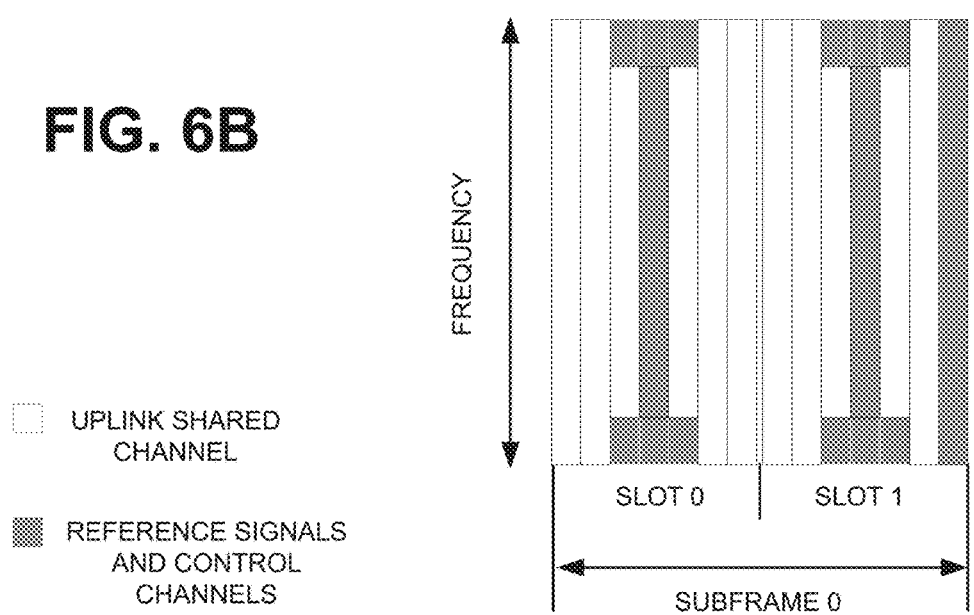

FIG. 6B illustrates an exemplary structure of a sub-frame of FDD uplink. As illustrated, the sub-frame may include many signals, in blocks that are shaded in gray. White areas are the PRBs that data may occupy. Some of these PRBs may be preemptively scheduled, to reduce IAB node latency, as noted. FIGS. 6A and 6B both illustrate PRBs within FDD radio frames. Although not shown. TDD radio frames comprise PRBs that may also be preemptively scheduled to reduce IAB node latency.

Figure 7:
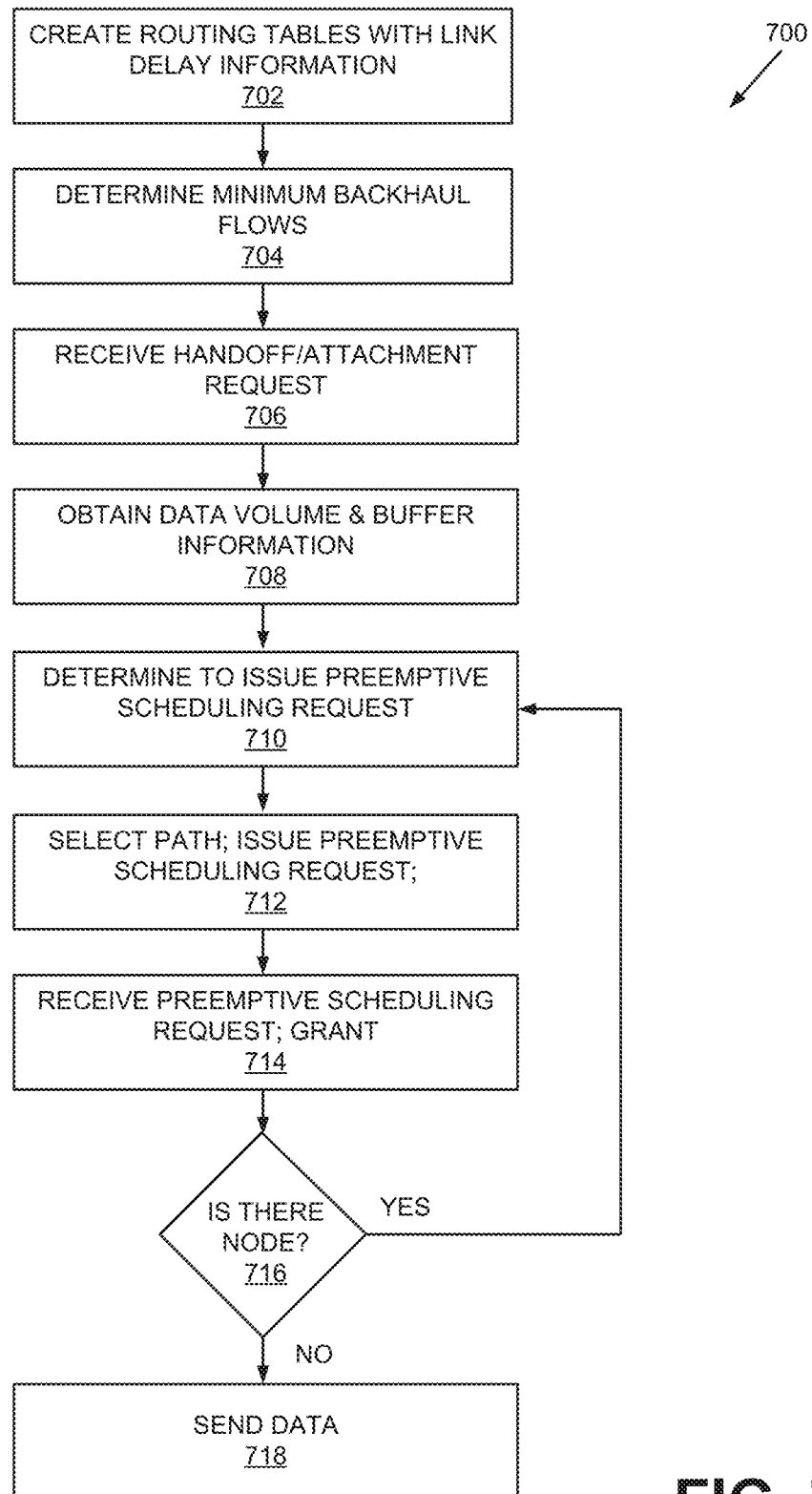
FIG. 7 is a flow diagram of an exemplary process that is associated with reducing latency in IAB nodes.
Figure 8A:
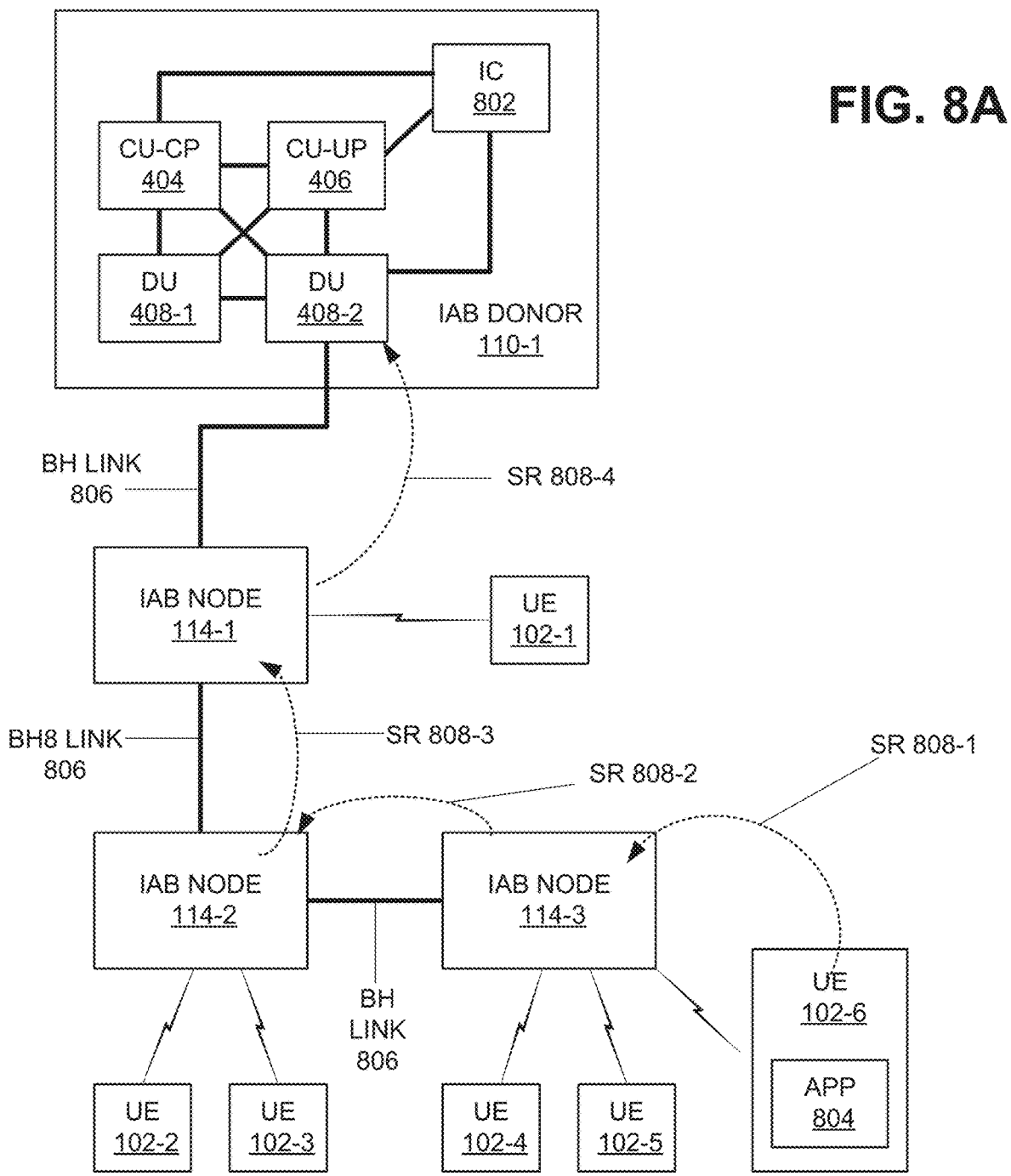
FIGS. 8A and 8B illustrate exemplary uplink and downlink signals in the process of FIG. 7.
Figure 8B:
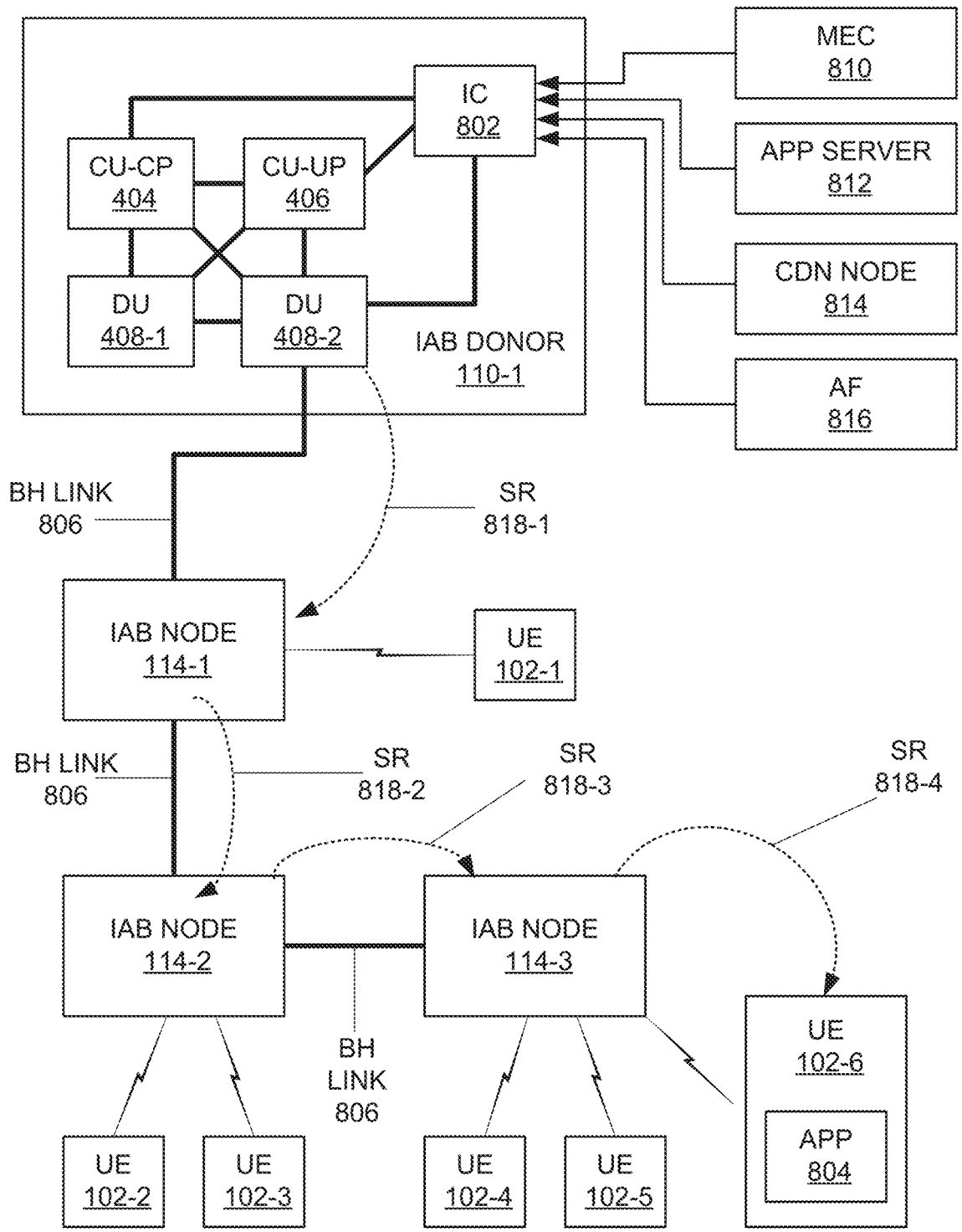

FIG. 7 is a flow diagram of an exemplary process 700 that is associated with reducing latency in IAB nodes. FIGS. 8A and 8B illustrate exemplary uplink and downlink signals discussed below for process 700 of FIG. 7. Process 700 may be performed by one or more of network components and devices, such as IAB donor 110-1, UE device 102, and IAB nodes 114. Assume that, in FIGS. 8A and 8B, IAB donor 110-1 and IAB nodes 114-1, 114-2, and 114-3 have established backhaul links 806 with one another. In addition, assume that UE devices 102-1 through 102-6 attach to IAB nodes 114 through access links during process 700 at different times.

As shown, process 700 may include creating routing tables with link delay information (block 702). For example, in one implementation, IAB donor 110-1 may create a routing table (e.g., RIB) based on signals through IAB nodes 114. In addition. IAB donor 110-1 may obtain, from IAB nodes 114, link delay measurement values. The delay measurements may be intrusive or non-intrusive. After constructing its RIB/FIB, IAB donor 110-1 may forward the RIB/FIB to IAB nodes 114. In a different implementation. JAB donor 110-1 may assemble its routing information by having each of IAB nodes 114 collect its respective connectivity and link delay information and then have the IAB nodes 114 exchange the collected routing information with one another. Once its RIB/FIB is complete, IAB donor 110-1 and IAB nodes 114 may update the RIB/FIB when a new IAB node 114 is attached to the network of IAB nodes 114 or one of the IAB nodes 114 is removed from the network of IAB nodes 114. In FIGS. 8A and 8B. IAB donor 110-1 and IAB nodes 114-1 through 114-3 may obtain routing information and exchange the routing information with one another.

Process 700 may further include IAB nodes 114 determining a minimum traffic on each of its backhaul links (block 704). For example, in FIGS. 8A and 8B, IAB node 114-1 may determine the minimum traffic on its backhaul link 806 to IAB donor 110-1; IAB node 114-2 may determine the minimum traffic on its backhaul link 806 to IAB node 114-1; and IAB node 114-3 may determine the minimum traffic on its backhaul link 806 to IAB node 114-2. The minimum traffic value may be obtained based on historical measurements or estimated based on calculated number of bits needed for various purposes, such as a heartbeat signal, routing signals, Key Performance Indicator (KPI) measurement signals, etc.

Process 700 may further include receiving, at an IAB node 114, a request to establish an access link from UE device 102 (block 706). For example, in FIG. 8A. IAB node 114-3 receives a request to establish an access link from UE device 102-6. Upon receipt of an access request, an IAB node 114 may determine whether the request can be granted, based on its access control procedures. For example, IAB node 114 may determine whether granting the request would result in reducing the bandwidth for the backhaul flow and/or whether the IAB node 114 can maintain its minimum backhaul reservations, to its parent IAB node 114. For example, in FIGS. 8A and 8B, when JAB node 114-3 receives an access request from UE device 102-6, IAB node 114-3 may determine whether it can maintain its minimum backhaul bandwidth while providing services to UE device 102-6. If so, IAB node 114-3 may establish an access link with UE device 102-6; otherwise, IAB node 114-3 may deny the request.

Process 700 may include obtaining data volume-related or buffer-related information associated with the application on UE device 102 (block 708). For example, UE device 102-6 may obtain the size of its transmission/receipt buffer, the size of data to be sent or received by its application, its bandwidth requirements, its latency requirements, etc. In some implementations, a specialized program in UE device 102-6, such as application 804, may perform such functions. Depending on the implementation, UE device 102 may report these values to IAB donor 110-1.

In another example, in FIG. 8B, an intelligent controller (IC) 802 in IAB donor 110-1 may obtain information to estimate the size of data to be transmitted to UE device 102, based on the IP flow information it collects. The flow information may be collected via various network devices/components, such as a Multi-Access Edge Computing (MEC) cluster 810, an application server 812, a CDN node 814, and/or an application function 816.

Process 700 may also include determining to issue a preemptive scheduling request (block 710). For example, referring to FIG. 8A, application 804 on UE device 102-6 may determines whether the latency over the communication path may be reduced (e.g., determine whether a potential latency based on the data is less than a threshold). In another example, referring to FIG. 8B, the intelligent controller 802 in IAB donor 110-1 may determine whether the latency over the communication path may be reduced.

In yet another example, IAB node 114-1, 114-2, or 114-3 may determine whether to issue a preemptive scheduling request when it receives a preemptive request from its parent node or a child node. In particular, if IAB node 114-1 has already received a downlink preemptive scheduling request from IAB donor 110-1. IAB node 114-1 may determine that it needs to issue its own downlink preemptive scheduling request to its child IAB node 114. Similarly, if IAB node 114-3 has already received an uplink preemptive scheduling request from UE device 102-6. IAB node 114-3 may determine that it needs to issue its own uplink preemptive scheduling request to its parent IAB node 114-2. More generally, each IAB node 114 may determine to issue its preemptive scheduling request upstream or downstream, based on the received preemptive scheduling request.

Process 700 may further include selecting a link/path through which the data is to be sent (block 712). For example, referring to FIG. 8B, the intelligent controller 802 may consult its routing table (e.g., RIB or FIB), select the path/link that is to be used for sending data with the least latency (e.g., rather than selecting a path to support the best QoS), and issue a preemptive scheduling request 818-1 over the selected link. It is assumed for this example that IAB donor 110-1 has multiple links through which it can forward downlink data to UE device 102-6, although only one backhaul link 806 is shown. In another example, using its own routing table. IAB node 114 may select a backhaul link 806 for forwarding data with the least latency when the IAB node 114 decides to send a preemptive scheduling request 808/818, and send the preemptive scheduling request 808/818 over the selected link.

Process 700 may include receiving a preemptive scheduling request (block 714), and then granting or denying the request (block 714). For example, referring to FIG. 8A, IAB node 114-3 may receive preemptive scheduling request 808-1 from UE device 102-6, and grant the request (i.e., schedule the transmission from UE 102-6 at particular PRBs). In another example referring to FIG. 8B, IAB node 114-1 may receive preemptive scheduling request 818-1 from intelligent controller 802 and grant the request (i.e., schedule the transmission from JAB donor 110-1 to occur at particular PRBs). In addition, each of IAB nodes 114 that are in the communication path between UE device 102 and IAB donor 110-1, may receive an uplink/downlink preemption request 808/818 from its child/parent node.

When a network device (one of IAB donor 110-1, IAB nodes 114, and/or UE device 102-6) grants a preemptive scheduling request, the network device may schedule the transmission from the requesting device based on various information, if available. For example, intelligent controller 802 may grant the preemptive scheduling request based on the bandwidth, latency, application buffer size, and/or other information that it obtains from UE device 102, JAB nodes 114, etc. Other IAB nodes 114 may behave similarly, with respect to both upstream and downstream preemptive scheduling requests.

At block 716, if there is a node upstream/downstream to the network device that received the preemptive scheduling request at block 714, process 700 may return to block 710. For example, referring to FIG. 8A, after IAB node 114-3 receives uplink preemptive scheduling request 808-1 from UE device 102-6, since there is a node upstream to IAB node 114-3 in the communication path between UE device 102-6 and JAB donor 110-1, IAB node 114-3 may decide to send its own preemptive scheduling request 808 to IAB node 114-2. Process 700 may cycle through blocks 710-714, with each IAB node 114 in the uplink path forwarding its own preemptive scheduling request 808, until IAB donor 110-1 is reached.

In a different example, referring to FIG. 8B, after IAB node 114-1 receives downlink preemptive scheduling request 818-1 from UE device 102-6, since there is a node downstream to IAB node 114-1 in the communication path between UE device 102-6 and IAB donor 110-1, IAB node 114-1 may decide to send its own preemptive scheduling request 818 to IAB node 114-2. Process 700 may cycle through blocks 710-714, with each JAB node 114 in the downlink path forwarding its own preemptive scheduling request 818, until UE device 102-6 is reached.

At block 716, having already granted the preemptive scheduling request at block 714, data may be sent in accordance with the schedule (block 716). For example, referring to FIG. 8A. UE device 102-6 may forward its data upstream to IAB node 114-3 after receiving its scheduling grant from IAB node 114-3. Each IAB node 114-3, 114-2, and 114-1 may act similarly, with each IAB node 114 sending the data that it received from its child node upstream, to its parent node in the selected path, until the data reaches IAB donor 110-1.

In the example of FIG. 8B, IAB donor 110-1 may forward its data downstream to IAB node 114-1 after receiving its scheduling grant from IAB node 114-1. Each IAB node 114-1, 114-2, and 114-3 may act similarly, with each IAB node 114 sending the data that it received from its parent node downstream, to its child node in the selected path, until the data reaches UE device 102-6.

For process 700, a number of features may be implemented to protect the integrity of backhaul links. For example, at block 712 and 714, for selecting a link and grating a preemptive scheduling request, IAB donor 110-1, UE device 102, or IAB node 114 may select the path or grant the preemptive scheduling request (i.e., schedule the transmission) in such a way to give the resources to its backhaul link (highest QoS), by preempting traffic with the lowest QoS levels. In another example, at block 716, each IAB node 114 and/or IAB donor 110-1 may reduce the throughputs of all other UE devices 102 attached to the IAB node 114 or IAB donor 119-1 to the extent that is allowed by their particular slice parameters in order to maintain the backhaul link.

Also, with respect to process 700, on some implementations, each scheduler in IAB donor 110-1, UE device 102, and IAB nodes 114 may include a delay bounded scheduler, which limits the number of IAB hops if the application at UE device 102 is of a particular type. In such implementations, the packets would be dropped at an IAB node 114 when the number of hops or the latency reaches a maximum hops threshold for the application type, and the UE device 102 may renegotiate a different QoS to meet an alternative target.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks have been described above with regard to the processes illustrated in FIG. 7, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. An Integrated Access and Backhaul (IAB) donor device comprising:
   a processor configured to:
      send a preemptive scheduling request from the IAB donor device to an IAB node over a wireless link between the IAB donor device and the IAB node;
      receive a scheduling grant from the IAB node over the wireless link; and
      send data to the IAB node over the wireless link at times indicated by the scheduling grant from the IAB node,
   wherein the IAB donor device includes a central unit (CU).

2. The IAB donor device of claim 1, wherein the processor is further configured to:
   obtain routing information associated with IAB nodes interconnected by wireless backhaul links, wherein the IAB nodes comprise the IAB node, and wherein the wireless link comprises one of the wireless backhaul links; and
   prior to sending the data, select the wireless link, among the wireless backhaul links, over which the IAB donor device is to send the data.

3. The IAB donor device of claim 2, wherein the routing information includes, for each of the wireless backhaul links, delay or latency information,
   wherein when the processor selects the wireless link, the processor identifies a network path from the IAB donor device to a destination device,
   wherein the network path comprises the wireless link; and
   wherein the network path has less latency than other networks paths, each of which comprises the wireless link, from the IAB donor device to the destination device.

4. The IAB donor device of claim 1, wherein the wireless link comprises a wireless backhaul link, and the processor is configured to:
receive a request, from a mobile terminal, to establish an access link;
determine whether granting the request would result in a bandwidth of the wireless backhaul link falling below a threshold; and
deny the request if the processor determines that granting the request would result in the bandwidth falling below the threshold; or
grant the request if the processor determines that granting the request would not result in the bandwidth falling below the threshold.

5. The IAB donor device of claim 1, wherein when the processor sends the data to the IAB node, the processor is configured to:
send the data to the IAB node over the wireless link at times indicated by the scheduling grant at a data rate that does not cause a second data rate over a wireless backhaul link to a network device to fall below a threshold.

6. The IAB donor device of claim 1, wherein the processor is further configured to:
receive information that indicates a size of a buffer for receiving second data, wherein the buffer has been allocated for an application on a network device, or
receive information that indicates bandwidth utilization level at the network device.

7. The IAB donor device of claim 6, wherein the network device includes a mobile terminal device.

8. The IAB donor device of claim 1, wherein the processor is further configured to:
receive a second preemptive scheduling request from a second IAB node;
generate a second scheduling grant; and
send the second scheduling grant to the second IAB node.

9. The IAB donor device of claim 8, further comprising a component configured to:
obtain at least one of flow information or bandwidth information associated with a remote device or associated with an application running at the remote device;
process at least one of the flow information or the bandwidth information to obtain processed information; and
provide the processed information to the processor, for the processor to generate the second scheduling grant.

10. The IAB donor device of claim 9, wherein when the component obtains at least one of the flow information or the bandwidth information, the component is configured to:
monitor the remote device for the flow information or the bandwidth information; or
obtain the flow information from one or more network devices.

11. The IAB donor device of claim 1, wherein the processor is further configured to:
receive path delay information and a second preemptive scheduling request for second data, from a network device; and
deny the second preemptive scheduling request when the delay information indicates one of:
a latency for the second data to reach the network device exceeds a threshold; or
a number of hops through IAB nodes to arrive at the network device would exceed a maximum hop threshold.

12. A method comprising:
sending a preemptive scheduling request from a an Integrated Access and Backhaul (IAB) donor device to an-IAB node over a wireless link between the IAB donor device and the IAB node;
receiving a scheduling grant from the IAB node over the wireless link; and
sending data to the IAB node over the wireless link at times indicated by the scheduling grant from the IAB node,
wherein the IAB donor device includes a central unit (CU).

13. The method of claim 12, further comprising:
obtaining routing information associated with IAB nodes interconnected by wireless backhaul links, wherein the IAB nodes comprise the IAB node, and wherein the wireless link comprises one of the wireless backhaul links; and
prior to sending the data, selecting the wireless link, among the wireless backhaul links, for sending the data.

14. The method of claim 13, wherein the routing information includes, for each of the wireless backhauls links, delay or latency information,
wherein selecting the wireless link includes identifying a network path from the IAB donor device to a destination device,
wherein the network path comprises the wireless link, and
wherein the network path has less latency than other networks paths, each of which comprises the wireless link, from the IAB donor device to the destination device.

15. The method of claim 12, wherein the wireless link comprises a wireless backhaul link, and wherein the method further comprises:
receiving a request, from a mobile terminal, to establish an access link;
determining whether granting the request would result in a bandwidth of the wireless backhaul link falling below a threshold; and
denying the request if it is determined that granting the request would result in the bandwidth falling below the threshold; or
granting the request if it is determined that granting the request would not result in the bandwidth falling below the threshold.

16. The method of claim 12, wherein sending the data to the IAB node includes:
sending the data to the IAB node over the wireless link at times indicated by the scheduling grant at a data rate that does not cause a second data rate over a wireless backhaul link to a network device to fall below a threshold.

17. The method of claim 12, further comprising:
receiving information that indicates a size of a buffer for receiving second data, wherein the buffer has been allocated for an application on a network device, or
receiving information that indicates a bandwidth utilization level at the network device.

18. The method of claim 17, wherein the network device includes a user equipment (UE) device.

19. A non-transitory computer-readable medium comprising processor-executable instructions, that when executed by one or more processors, cause the one or more processors to:
send a preemptive scheduling request from an Integrated Access and Backhaul (IAB) donor device to an IAB node over a wireless link between the IAB donor device and the IAB node, wherein the IAB donor device includes the one or more processors;

receive a scheduling grant from the IAB node over the wireless link; and send data to the IAB node over the wireless link at times indicated by the scheduling grant from the IAB node, wherein the IAB donor device includes a central unit (CU).

20. The non-transitory computer-readable medium of claim 19, wherein when executed by the one or more processors, the processor-executable instructions further cause the one or more processors to:

obtain routing information associated with IAB nodes interconnected by wireless backhaul links, wherein the IAB nodes comprise the IAB node, and wherein the wireless link comprises one of the wireless backhaul links; and prior to sending the data, select the wireless link, among the wireless backhaul links, over which the IAB donor device is to send the data.

\* \* \* \* \*